(12) United States Patent
Addink et al.

(10) Patent No.: US 6,679,561 B2
(45) Date of Patent: Jan. 20, 2004

(54) PAIRED SPOKE BICYCLE WHEEL WITH OPTIMIZED RIM EXTRUSION AND SPOKE SPACING AND COMPONENTS THEREOF

(75) Inventors: Bradley J. Addink, Madison, WI (US); Dirk J. Rettig, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 10/008,009

(22) Filed: Nov. 8, 2001

(65) Prior Publication Data

US 2003/0085610 A1 May 8, 2003

(51) Int. Cl.[7] .............................. B60B 1/02; B60B 21/06
(52) U.S. Cl. .............................. 301/55; 301/58; 301/59
(58) Field of Search .......................... 301/55 I, 56, 58, 301/59, 61, 110.5

(56) References Cited

U.S. PATENT DOCUMENTS

| | | | |
|---|---|---|---|
| 677,525 A | | 7/1901 | Loverin |
| 1,067,296 A | | 7/1913 | Andresen |
| 1,418,331 A | * | 6/1922 | Schenck et al. ............... 301/59 |
| 1,423,373 A | | 7/1922 | Wagenhorst |
| 1,474,631 A | | 11/1923 | House, Jr. |
| 4,622,731 A | * | 11/1986 | Kjell ..................... 28/894.361 |
| 5,104,199 A | | 4/1992 | Schlanger |
| 5,445,439 A | | 8/1995 | Dietrich |
| 5,931,544 A | | 8/1999 | Dietrich |
| 5,938,293 A | | 8/1999 | Dietrich |
| 5,947,565 A | * | 9/1999 | Dietrich ....................... 301/59 |
| 5,975,646 A | * | 11/1999 | Campagnolo .......... 301/95.104 |
| 6,024,414 A | * | 2/2000 | Dietrich ....................... 301/59 |
| 6,158,819 A | | 12/2000 | Okajima et al. |
| 6,196,638 B1 | | 3/2001 | Mizuno et al. |
| 6,213,562 B1 | | 4/2001 | Muraoka et al. |
| 6,231,128 B1 | | 5/2001 | Okajima et al. |
| 6,234,580 B1 | | 5/2001 | Muraoka et al. |
| 6,257,677 B1 | * | 7/2001 | Chen ............................ 301/58 |
| 6,283,557 B1 | * | 9/2001 | Okajima et al. ....... 301/95.104 |
| 6,409,278 B1 | * | 6/2002 | Nakajima ..................... 301/59 |

FOREIGN PATENT DOCUMENTS

| | | |
|---|---|---|
| DE | 1405736 | 11/1968 |
| DE | 2115026 | 9/1972 |

(List continued on next page.)

OTHER PUBLICATIONS

Photographs, T. B. 81, Winter 1978.

(List continued on next page.)

Primary Examiner—S. Joseph Morano
Assistant Examiner—Jason R. Bellinger
(74) Attorney, Agent, or Firm—David C. Brezina; Barness Thornburg (57) ABSTRACT

A paired spoke bicycle wheel has optimized circumferentially offset spoke spacing which minimizes high stress imposed by overly close spacing and reduces long felt difficulties resulting from out of balance loads of unpaired spokes, the rear wheel additionally having similar spoke angles in a lateral plane while displacing brake surfaces to a centered location when allowing for clearance for a drive cogset.

20 Claims, 5 Drawing Sheets

FOREIGN PATENT DOCUMENTS

| | | |
|---|---|---|
| FR | 449573 | 10/1912 |
| FR | 1019285 | 1/1953 |
| GB | 2236 | of 1870 |
| GB | 3959 | 11/1874 |
| GB | 4478 | 11/1876 |
| GB | 1956 | of 1877 |
| GB | 3388 | 11/1877 |
| GB | 3056 | of 1890 |
| GB | 5968 | 2/1891 |
| GB | 334941 | 9/1930 |
| GB | 689593 | 4/1953 |
| JP | 59-351-01 | 3/1984 |
| JP | 9-254601 | 9/1997 |
| JP | 11-105501 | 4/1999 |

OTHER PUBLICATIONS

Photographs of Miss Reynolds in "The Bone Shaker" 208.
Drawing in The Bone Shaker No. 42, Spring 1966.
"The Bone Shaker" vol. 2, No. 20a, Summer 1960.
Chapter 17 of 1896 Edition of Sharp "Bicycles & Tricycles and Elementary Treatise on their Design & Construction".
Starley Fan Tangent Wheel described in the "History of the Cycle Wheel 1872–1930".
Drawing in "The Bone Shaker" No. 42, Spring 1966.

* cited by examiner

PRIOR ART

PAIRED SPOKE BICYCLE WHEEL WITH OPTIMIZED RIM EXTRUSION AND SPOKE SPACING AND COMPONENTS THEREOF

BACKGROUND OF THE INVENTION

1. Field of the Invention

The invention relates to paired spoke bicycle wheels having an optimized rim extrusion and spoke pacing which enables lighter and stronger wheels for improved performance. By spacing tensioned spokes optimally, mechanical stress on the rim structure is minimized between rim failure from high stress concentration and rim distortion from longer distances between spokes. This enables lighter and stronger rims, the rims being optimized having a sectional shape of an irregular pentagon.

2. Description of Related Art

Several pieces of prior art describe the potential, and as yet, not optimized advantages of paired spoke bicycle wheels over a century of development. As early as 1889, the U.K. patent to Lovelace No. 3056 (Feb. 20, 1889) describes paired spokes: "the spokes the each are screwed into the hub flange is w, in a line which is a tangent to a circle somewhat smaller than the said flange, and two spokes, that is to say, one from each end of the hub, meet at the same point in the rim as shown clearly in FIG. 5 . . . ". The motivation for paired spokes is explained, continuing: "thus bringing the strain to bear equally upon the rim and avoiding the liability to buckle, which is attendant on the usual arrangement".

Another paired spoke reference is French patent No. 1,019,285 issued to Menet dated Jan. 20, 1953. A copy of an English translation of Menet was filed in the application which issued as U.S. Pat. No. 5,931,544. It is on this translation that the explanation herein relies, although the terminology is also recognized as consistent with the disclosure in Menet's drawings.

Menet describes a bicycle wheel having, among other features, " . . . on the rim on both sides of the median plane, perpendicular to the axis of the wheel, and arranged more or less in a straight line parallel to the axis of said wheel . . . ". Menet teaches a hub, axle and paired spokes: "the spokes are distributed on the rim in groups of two, having their . . . points of attachment on the hub of the wheel almost on the same line . . . ". Menet describes tensioned, paired spokes, with two ends: " . . . on the threaded ends of the spokes, nuts 4 are screwed on in the usual manner . . . . On the other end the two spokes of the same group will advantageously be fastened to the hub of the wheel, at points 5 . . . ".

While Lovelace described the advantage as reduced "strain", Menet's translation uses a more dynamic description of the purpose of paired spoking: "thus increasing the lateral rigidity of the wheel and freeing the rim from the abnormal torsional forces to which normal rims are subjected when used until it becomes possible to considerably ease the strain on the rims without risk of warping" and "to attain as perfect a symmetry as possible of the spokes on [on] both sides of a median plane, perpendicular to the axis of the wheel".

Bicycle wheels are, of course subject to both static loads and dynamic forces, and the "strain" observed by Lovelace necessarily translates to transverse changes at the rim as a tensioned spoke wheel, bearing the mass of the bicycle and rider, and acceleration and deceleration forces, contacts pavement while rolling. These dynamic forces are Menet's "torsional forces to which . . . rims are subjected when used". Measurements of this are suggested in the aforementioned U.S. Pat. No. 5,931,544, although the inventor herein has been unable to reproduce all of the tests described in U.S. Pat. No. 5,931,544, or its parent, U.S. Pat. No. 5,104, 199. However, it is believed that the tests in these two patents were static lateral load tests, not dynamic tests. It is believed that the lack of precision resulted in rims that were unduly heavy for their strength because of their closely spaced spoked design.

Two other problems were observed in the prior art. These are not believed to have been solved by the prior art.

First, paired spokes, while producing a more even strain having advantages on a rotating wheel, have the considerable disadvantage of concentrating that strain in a small area on the rim. Menet suggests a reinforcing boss: "To reinforce the fastening of the spokes, 4 two-holed bracket 7 can be inserted between the nuts and the rim". It will be appreciated that adding material and pieces to a structure optimized for strength and weight is disadvantageous, in addition to the added expense and other inefficiency of having added components needed.

Second is the difficulty in placing paired spokes that are perfectly paired precisely opposite one another on a narrow rim. A second Lovelace patent, No. 5968 Apr. 19, 1890 anticipated one of the embodiments of Dietrich '544: "The arrangement of spokes shown in FIGS. 4 and 5, of my aforesaid drawings cannot conveniently be applied to a narrower rim, as there is not room for the spokes to be placed opposite each other; in such cases I make two holes, one in front of the other, and near together for each pair of spokes going to opposite sides of the hub, this gives practically all the advantages of the former arrangement, while it enables the method to be applied to narrow rims." The "aforesaid drawings" are those in Lovelace No. 3056. The circumferential offset is shown in FIGS. 6 and 7 of the Lovelace 5968 patent and described: "In the improved arrangement for attaching spokes to the wheel rims, I make two holes in the rim one in front of the other and near together, but slightly on the skew, that is to say the holes are made in a line which is diagonal to the rim, the holes are countersunk on the inside to receive the heads of the spokes and one spoke of each pair goes to one end of the hub and the other spoke to the other end, as described in my prior specification No. 3056 of 1899." Lovelace 5968 if scaled to the proportion of modem road bicycle wheels, of about one inch, would provide circumferential spacing of about 0.3 inches.

U.S. Pat. No. 1,474,631 issued Nov. 20, 1923 to House also shows a combination of paired (13, 15) and unpaired (14) spokes on a wheel. House explains that the heavy loads on wagons or artillery carriages subject spoked wheels to forces that impose lateral or transverse loads as the wheels rotate.

Certain production paired spoke rims made by the assignee of this application, and which are outside the scope of the teachings of the aforementioned Dietrich '544 patent have had spokes spaced about 28 mm (1.1 inches) to about 33 mm (1.3 inches). While functional, these wheels need to rely on the rim rigidity to reduce the tendency towards wheel wobble, as opposed to the invention which optimizes for reducing both stress and wobble tendency. Embodiments of Dietrich-style paired spoke wheels have typically been limited to not greater than three quarters of 1 inch (19.05 mm) while standard, non-paired spoke wheels typically have spacing of around 2 inches.

Other commercial paired spoke embodiments have been sold, but these mount spokes in a reversed manner such that the spoke head is in the side wall rim and the nipple is at the hub. These are typified in U.S. Pat. Nos. 6,196,638, 6,213,562 and 6,234,580, or with crossed wire spokes penetrating the side wall of the rim, U.S. Pat. Nos. 6,158,819 and 6,231,128. These provide a much different solution than that of the instant invention, putting more material to support the rim, at the expense of a deeper, hence heavier, structure, and using a complex hub.

The spoking of the invention solves the two problems of varying transverse loads upon rotation under axle loads, while also avoiding concentration of stress and strain on the structure of the rim by pairing spokes but spacing them sufficiently apart to decrease the loads on the rim structure to levels which permit thinner, lighter rims.

Rim sections also have need for optimized form, particularly for rear wheels used on bicycles having modem multiple speed cog sets. While symmetrically formed and symmetrically spoked rear wheels have been adequate for geared bicycles typically having five rear cogs—when multiplied by two front chain wheels comprising the "ten speeds" of the post-war period through the late 1990's—contemporary gear mechanisms use as many as nine or ten speeds on the rear alone. The spacing required for these mechanisms require the spacing of the cog-side hub flange a considerable distance from the bicycle's "drop-outs" upon which the axle is clampingly affixed. Traditionally "dishing" the rear wheel using different length spokes enabled the clearance for the cogset, while still positioning the rim and tire on the centerline of the bicycle. Positioning the on the centerline is important for proper performance, particularly braking and steering. Krampera, U.S. Pat. No. 5,228,756 discloses a not altogether satisfactory solution of drilling spoke holes off center, on an occasionally twisted rim having an otherwise generally symmetric section. The instant invention is shaped to permit the spokes to fit holes that are substantially equidistant from the rim walls as they intersect the spoke bed, thereby eliminating the need for excess material and the detrimental mass and differential strength properties thereof that result from the asymmetrically located holes of Krampera. Krampera's alternatives use extrusions having webs of varying thickness to compensate for his asymmetry, which cause stress concentration and result in unacceptably heavy or alternatively, unacceptably strong rims. The instant rim will be referred to as an offset rim, to distinguish from the asymmetric rim of Krampera, as the instant rim optimizes weight, strength and geometry.

SUMMARY OF THE INVENTION

The invention pairs spokes but spaces them sufficiently apart to decrease the loads on the rim structure to levels which permit thinner, lighter rims. This arrangement minimizes varying transverse loads imposed on rotation under axle loads, while also minimizes concentration of stress and strain on the structure of the rim by spacing the spokes 26 mm (1.02 inches) apart. It will be understood that within the limits of the measurements provided, 26 mm mathematically converts to slightly more than 1 inch.

The new rim design of the invention increases the stiffness and durability of our wheelset while maintaining a lightweight rim. An offset spoke bed rim profile minimizes the difference in spoke angle between the drive side and non-drive side spokes while using a common brakewall width and height allows quick wheel changes without brake pad adjustment and consistent braking performance In addition to rear rim profile, ideal spoke hole spacing, termed circumferential offset or skew in the prior art, is important for optimizing strength, minimizing weight and maximizing performance. Paired spokes additional provide ease of assembly and adjustment in that conventional wheels require adjusting three spoke tensions to adjust a hob or wobble in the rim, two drive, or right spokes and a left, or nondrive spoke.

The invention takes advantage of the discovery that at a spacing, skew or circumferential offset of 26 mm (1.02 inches) stress on the spoke bed is minimized yet distortion on the rim from a radial plane—the center plane of the wheel—is also minimized, these determinations, therefore, enabling lighter and better performing rims. By comparison with prior art spacing, such as that disclosed in Dietrich '544, of 9 mm, stress in is reduced by sixteen percent (16%).

This optimization becomes particularly problematic when dealing with a rear wheel. One condition is the desirability in manufacturing for a minimum number of different size parts. In prior art hubs, for example, one solution to the different performance of a dished drive wheel was the use of different sized flanges and potentially different sized spokes. The instant invention enables the use of similarly sized flanges and spokes for improved performance and manufacturability. Additionally, it is valuable to enable machine wheel building, but prior art hubs with spoke holes in line were not adaptable to machine wheel building because of the clearances involved. Offsetting spoke holes in the flanges circumferentially as described herein enables machine wheel building.

Because of the need to provide clearance for a cogset and the incumbent variations between the left and right side of the wheel, it has also been determined that it is possible to manufacture wheels automatically and with greater economy and efficiency by using spokes of the same length. Traditionally, hub flange spoke holes on paired spoked wheels have been coaxial, that is, with a common centerline, perpendicular to the centerline of the axle. The front wheel in the invention uses this arrangement. Traditional non-paired wheels used spoke holes evenly spaced around the flange. These arrangements all required the use of different spoke lengths to achieve the required "dish" of the rear wheel. However, laced, crossed spokes as shown herein can advantageously use same length spokes by imposing a slight radial offset. This, coupled with the rim offset, enables use of same-length spokes.

In addition to the circumferential offset, improvements permitted by this invention over prior paired spoke and nonpaired spoke wheels include the use of the special rear rim profile that, in a finished wheel, permits improved spoke alignment to effectively reduce "dish" imposed by different length and differently angled spokes, and instead achieve centered alignment of the braking surfaces and tire with combined spoke hole, flange and rim profile orientation. Common or near-common left and right spoke angles in a sectional view can reduce tension disparities between left and right side, or drive and nondrive side, spokes.

DESCRIPTION OF PREFERRED EMBODIMENTS

Figure 1:
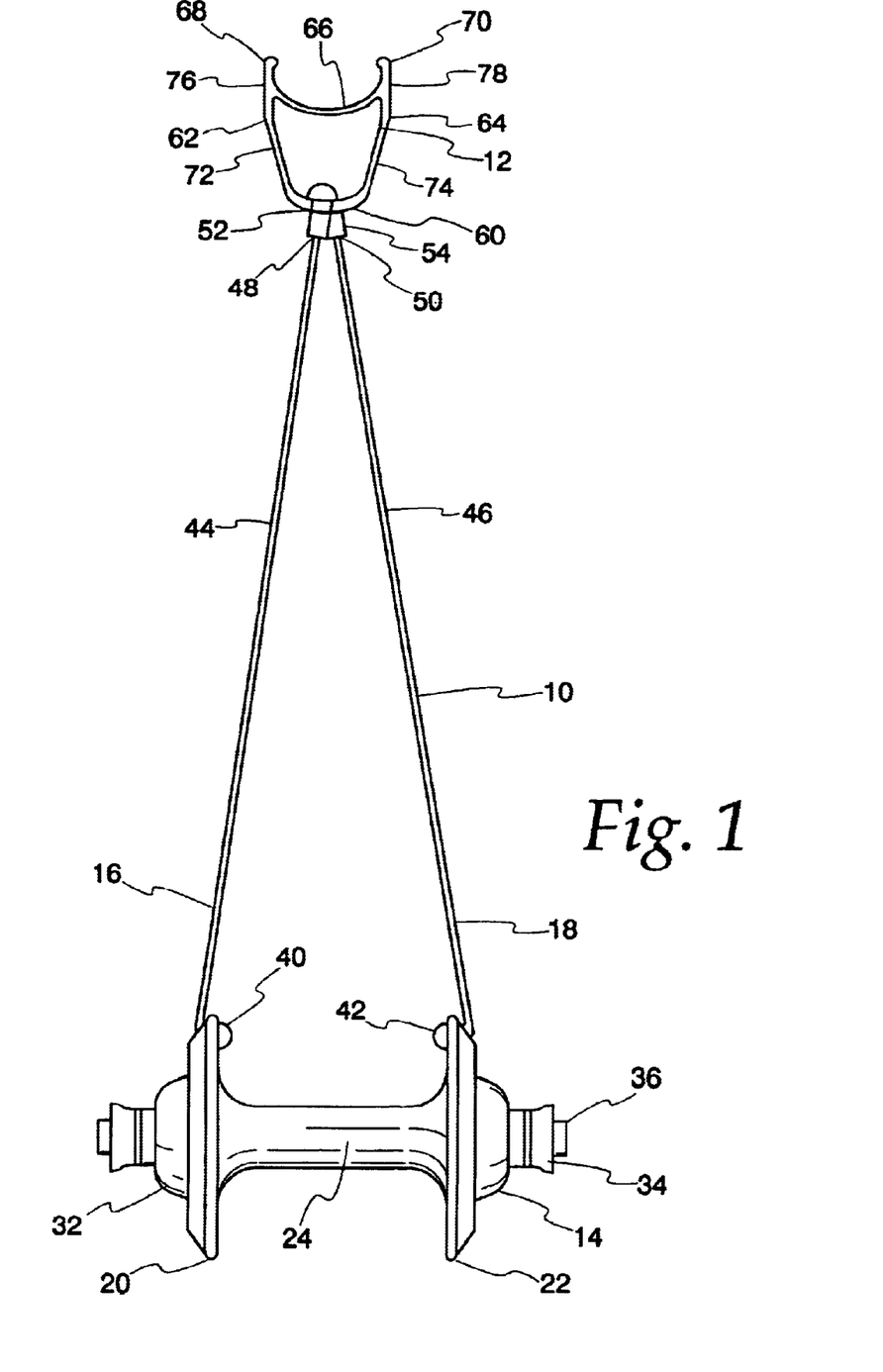
FIG. 1 is a sectional view of a front bicycle wheel of the invention.
Figure 3:
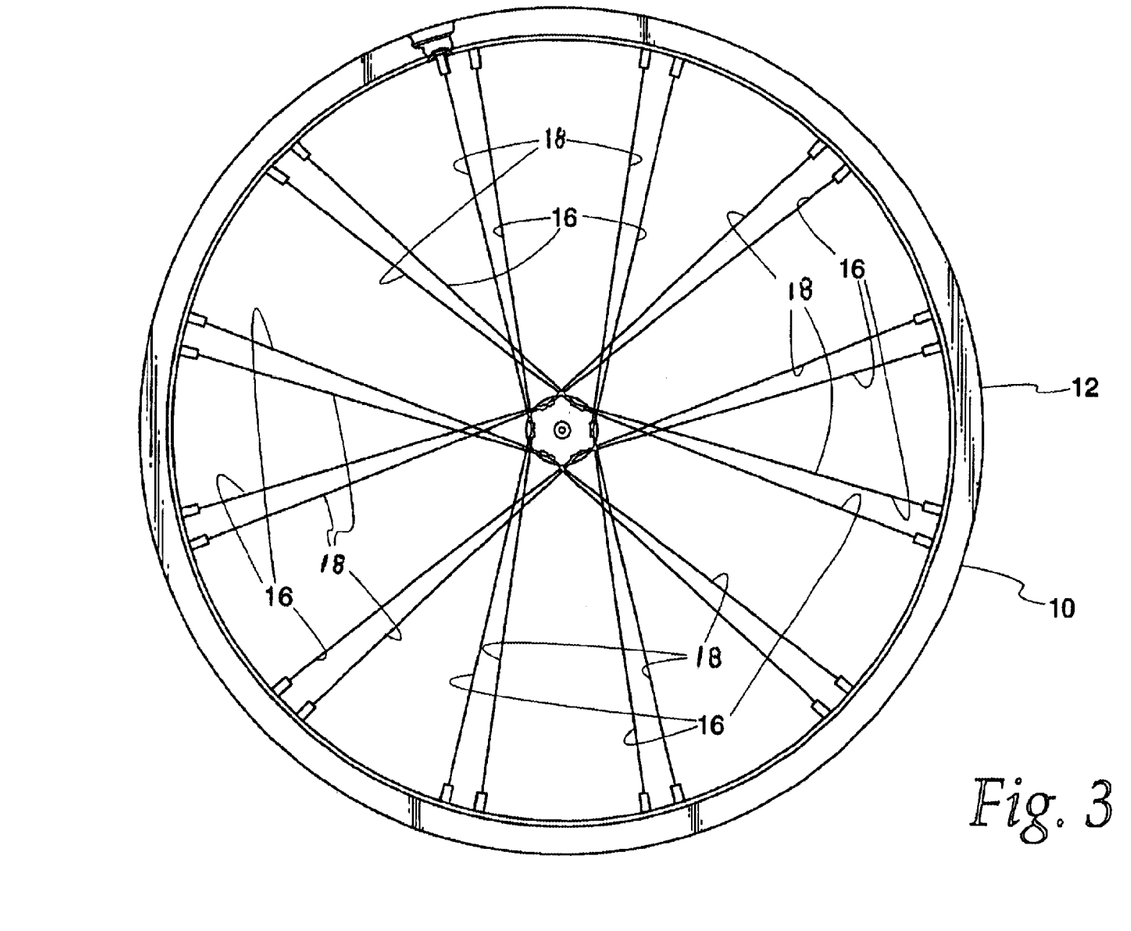
FIG. 3 is an elevation of a front bicycle wheel of the invention.

A front bicycle wheel 10 is typically formed with a rim 12 laced to a hub 14 with left and right sets of spokes 16, 18. A hub 14 has left and right flanges 20, 22 spaced apart by a typically, generally cylindrical body portion 24. The cylindrical body portion has a bore with bearing assemblies at either end 32, 34. The bore and bearing arrangement will be familiar to one of ordinary skill, and are substantially similar to the arrangement shown in section in FIG. 5. The bearing assemblies rotatably carry an axle assembly 36. Bearings axles and the related components are advantageously designed to use generally standard, replaceable and serviceable units, known to one of ordinary skill.

Each left and right spoke 16, 18 each preferably have heads 40, 42 elongate center portions 44, 46 and threaded end portions 48, 50. End portions 48, 50 are received by left and right spoke nipples 52, 54. It will be understood that the described spoke and nipple arrangement has significant economies, represent a wealth of experience in dealing with their strength and are well adapted to automated wheel building machinery. However, to the extent that the invention does not require a specific orientation of head and adjustment and tensioning, other spoke tensioning arrangements are known, provided there is adequate material strength and durability. Thus, arrangements such as a Lovelace spoke with the head at the rim and the threads engaging the hub, modernized for current materials technology.

Typical rims 12 have a spoke bed or web, 60 a pair of outwardly extending left and right walls 62, 64 and a tube bed or web 66 with tire bead receiving left and right flanges 68, 70 extending outwardly therefrom. Variations in form include rims for tubular tires which have no flanges and are therefore of a generally box section, albeit with a concave tube bed or web, and more aerodynamic sections in which the walls smoothly and perhaps elliptically taper to a narrower radiused spoke bed. Finally, walls 62, 64 may be formed in intermediate portions 72, 74 and braking surface portions 76, 78. The teachings here are expected adaptable to various forms such as these.

Figure 2:
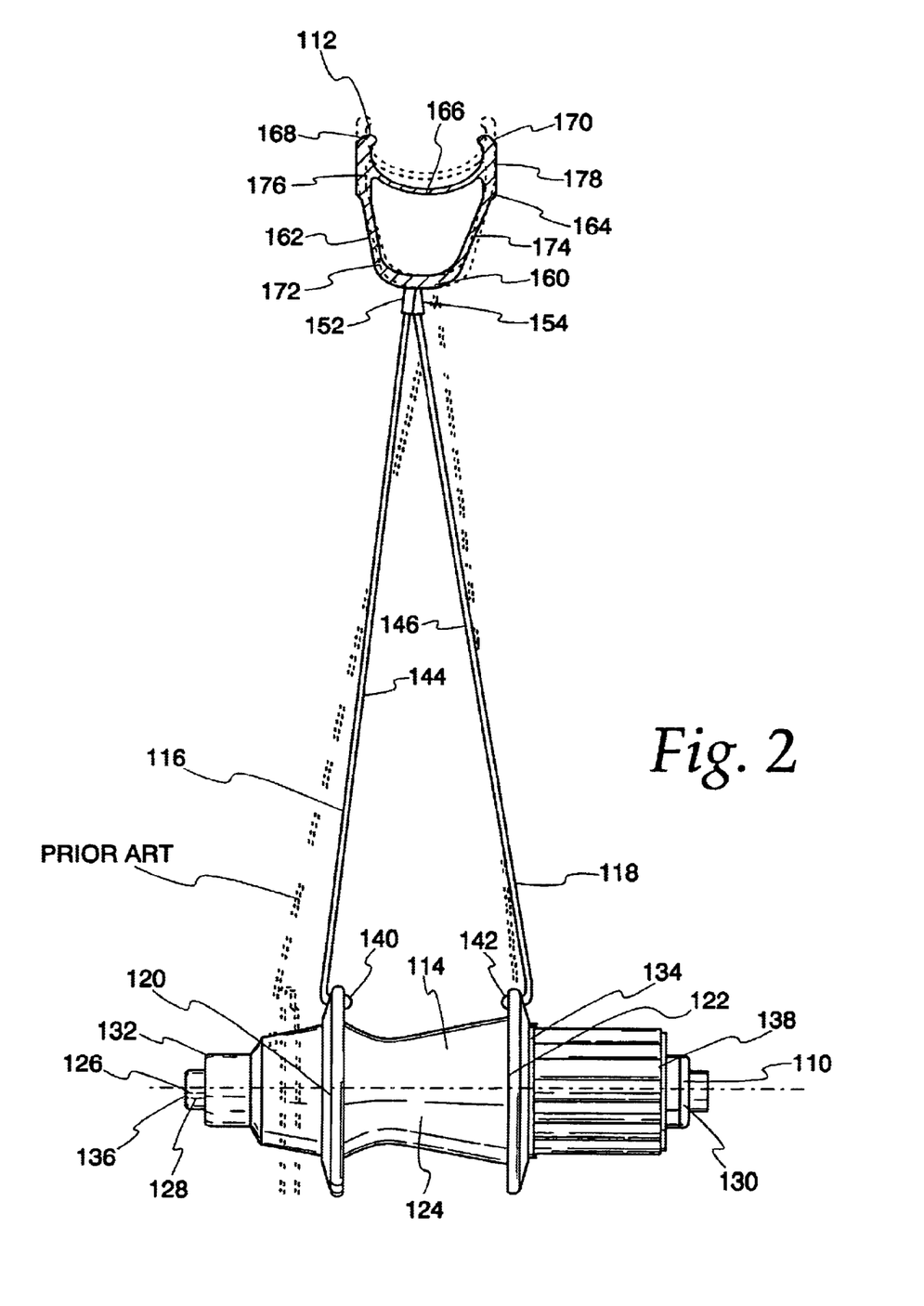
FIG. 2 is a sectional view of a rear bicycle wheel of the invention.

A rear bicycle wheel 110 is typically formed with a rim 112 laced to a hub 114 with left and right sets of spokes 116, 118. A hub 114 has left and right flanges 120, 122 spaced apart by a typically, generally cylindrical body portion 124. The cylindrical body portion 124 has a bore 126 with bearing assemblies 128, 130 at either end 132, 134. The bearing assemblies rotatably carry an axle assembly 136.

On a rear wheel, 110, a drive member 138 carries the cogs through which motive force is transferred from the rider to the wheel 110. As is known to one of ordinary skill, the drive member 138 that predominates on contemporary high performance bicycles has a ratchet internal with the assembly that comprises hub 114. Typically, these fit on splined members. Older, and bicycles of a lower performance design may have a drive member 138 that receives a freewheel that has a ratchet and cogs and typically threaded to the hub 114 at drive member 138. Freewheels typically did not require the extreme wheel "dish" of the contemporary large capacity cogset. Nevertheless, the instant invention is not limited to a particular drive arrangement. Bearings axles and the related components are advantageously designed to use generally standard, replaceable and serviceable units, known to one of ordinary skill.

Each left and right spoke 116, 118 each preferably have heads 140, 142 elongate center portions 144, 146 and threaded end portions 148, 150. End portions 148, 150 are received by left and right spoke nipples or nuts 152, 154. As with the front wheel, the spoke and nipple arrangement has significant practical advantages. Nevertheless, other spoke tensioning arrangements are known, provided there is adequate material strength and durability.

The novel rear rim 112 has a spoke bed or web 160 which receives the spokes 116, 118 in nipples or nuts 152, 154. Outwardly extending left and right walls 162, 164 are formed and arranged so that operating in conjunction with reducing the spacing of left and right flanges 120, 122, enable the spokes 116, 118 meet at angles off the vertical that are closer than would be permitted with prior arrangements. "The vertical" as referred to in this specification will be understood to mean an imaginary line intersecting the centerline of the rim, and which is also perpendicular to the axis of the hub, said imaginary line being vertical when the wheel is balanced and at rest. The combination of these developments yields a tension disparity between the left and right side of 67%. Previous designs yield a tension disparity of 127%. A more durable wheel is achieved if the difference between the left and right side spoke tensions is minimized.

Rear rim 112 has a tube bed or web 166 with tire bead receiving left and right flanges 168, 170 extending outwardly therefrom. Walls 162, 164 are preferably formed in intermediate portions 172, 174 and braking surface portions 176, 178. The teachings here are expected adaptable to various forms with geometric adjustments such that different rim section shapes can be used—highly aerodynamic shapes for certain conditions, riding styles or preferences such as time trials or triathlons, more resilient shapes for rough conditions such as cobblestones or mountain bike use, and the like.

Spoke bed 160 is offset to enable a profile of rim 112 which minimizes the difference in spoke angle between the spokes on the right or drive side 118 and the spokes on the left or nondrive side 116. Preferably 0.060 inch is a desired offset. An advantage to this offset is that it permits a high strength spoke arrangement permits using a brakewall width and height common to a full line of bicycle wheel rims, which allows quick wheel changes without brake pad adjustment.

As can be seen from the drawings, tube bed 166 spans walls 162, 164. Preferably tire head receiving left and right flanges 168, 170 extend outwardly from said walls 162, 164 at their intersection with said tube bed 166. However, a sectional shape such as shown is readily adaptable to tubular or "sew-up" tires by omitting said flanges. It will be noted that the arc that defines tube bed 166 is on a center that is aligned with the centerline equidistant between braking surface portions 176, 178.

The geometry of left, or first intermediate portion 172 and right, and second intermediate portion 174 extends them outwardly from spoke bed 160 to said first and second braking surface portions 176, 178, respectively, assuring that braking surface portions 176, 178 lie equidistant from the centerline of the bicycle itself for maximum brake and handling performance.

It can be seen that the left, or first intermediate portion 172 extends outwardly the wheel center plane at an angle slightly off a parallel from the wheel center plane. By comparison, right, or second intermediate portion 174 extends outwardly from said center plane at an angle off a parallel from said center plane that is substantially greater than the angle of said left, or first intermediate portion 172.

The invention is based on determination of the ideal spacing for left and right spoke holes 180, 182 formed in spoke bed 160 to enable a strong and lightweight rim 112. Certain advantages exist regarding paired spoke rims, in addition to those noted by prior art such as Lovelace and Menet, cited above. By pairing spokes 16, 18 and 116, 118 around a rim 12, 112, a design can reduce the time and difficulty in building a wheel 10, 110 to minimize hop and wobble, critical for a machine built wheel 10, 110. In a conventionally spaced wheel, it requires adjusting three spoke tensions to adjust a hop or wobble in the rim, two right or drive spokes and a left, or nondrive spoke or vice-versa. A paired spoke wheel, 10, 110 requires adjusting the tension in only two spokes 16, 116, and 18, 118 for the same section of rim 12, 112.

With this in mind, it was determined that 26 mm (or about 1.02 inches) measured from the center of spokes 16, 116 to the center of spoke 18, 118 on the spoke bed 60, 160 is the closest spacing possible without increasing the stress on the spoke bed 60, 160 of the rim 12, 112. At less than 26 mm spacing, the spoke tensions start to act together, creating a stress higher than any stress just one spoke can achieve. This arrangement results in a stress reduction on average of sixteen percent (16%) from a spacing of 9 mm.

This spacing of spokes 16, 116, 18, 118 in this manner maximizes the stiffness of the rim 12, 112 in both radial and lateral planes. The thickness of spoke bed 60, 160 working in conjunction with the outer profile from above, the angles of the sidewalls 62, 162 and 64, 164, their shapes as between rim intermediate portions 72, 172, 74, 174 and the radii as the merge into braking surface portions 76, 176 and 78, 178 are optimize until the lightest, stiffest rim 12, 112 possible is achieved. However, unless both the stress is minimized and the tendency to wobble under load is also minimized—spacing neither too close, because stress is increased, nor too far because wobble will increase—the lightness of the rim is sacrificed, because either strength at the spoke holes or stiffness will need to be increased by adding more material.

The offset of the flange spoke holes 184, 186 between the left and right side flanges 120, 122 of a rear hub is a result of the spacing between the spoke holes 180, 182 in the rim 112 and a desire to manufacture the wheel 110 with a minimal variation in spoke lengths for a given wheel. If a wheel is made with perfectly paired spokes at the rim 112, a spoke from the left side flange meets at the rim in the same location as a spoke from the right side flange, then the offset between the spoke holes on the left side flange to the spokes holes on the right side flange can be zero degrees (0°). The further that the spokes 116, 118 are spaced apart from each other at the rim 112, the greater the spoke hole circumferential offset that is required to achieve a wheel built with just two specific spoke lengths.

Figure 4:
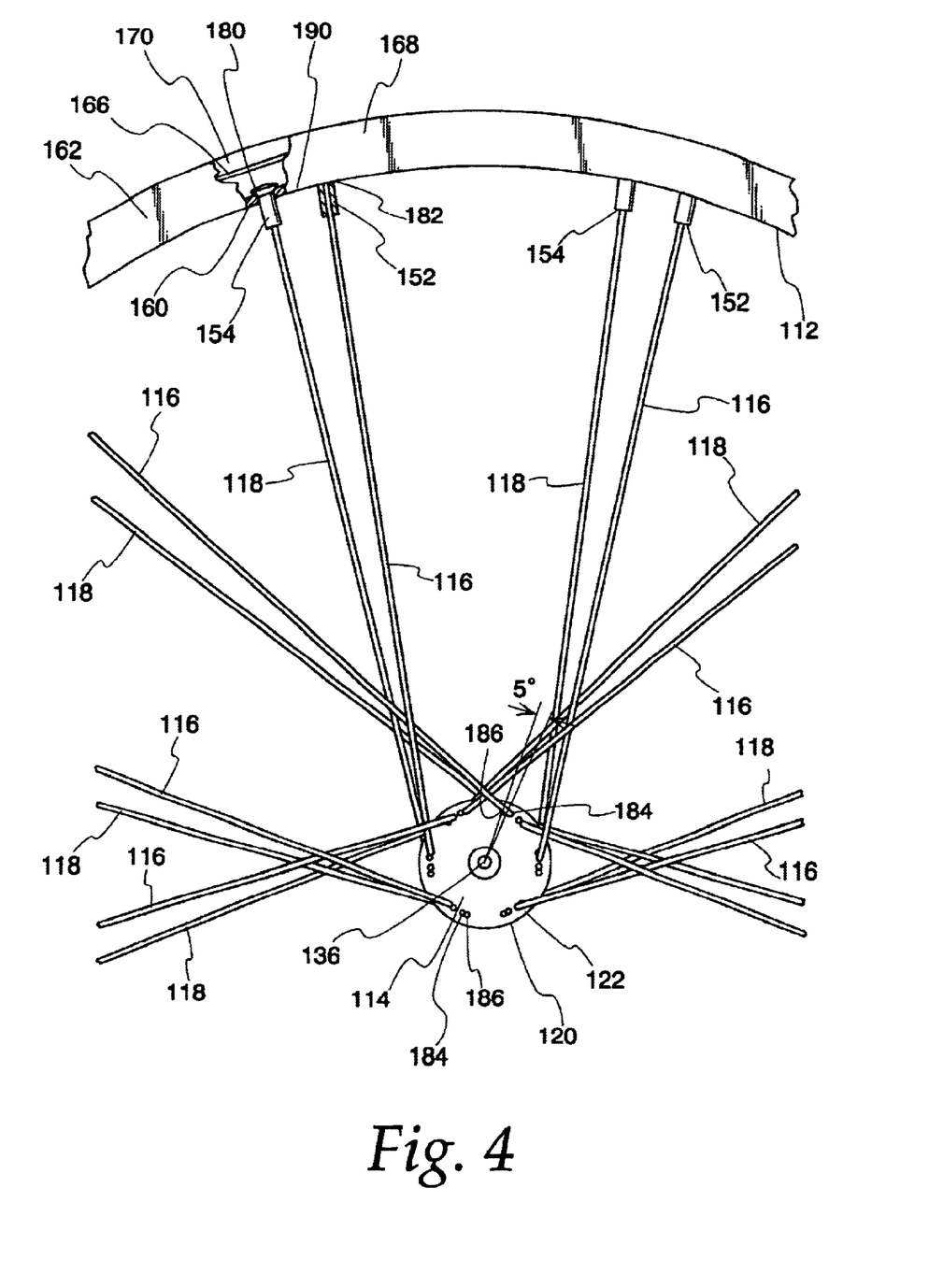
FIG. 4 is a fragmentary view of the hub, spoke and rim arrangement of the invention, with some spokes eliminated.
Figure 6:
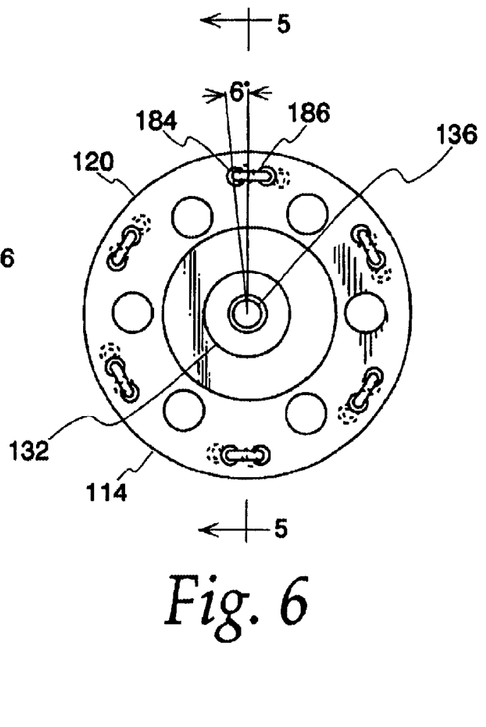
FIG. 6 is a left side plan view of a rear hub.

It will be seen in FIG. 6 that the circumferential offset of flange spoke holes 184, 186, one 184 being in the left flange 120, and the other 186 being in the hidden right flange 122, are offset six degrees (6°), although close to five degrees (5°) has been found acceptable, and, indeed, is shown in FIG. 4. It will also be noted that in the embodiment shown in FIG. 6, the holes 184, 186 are formed in a "bar-bell" shape, actually two round holes joined by a slot, which is particularly adapted to receive aerodynamic "bladed" spokes which have a flattened center portion aligned with the direction of wheel rotation for reduced air resistance.

An added benefit to spokes 16, 116, 18, 118 offset at the rim 12,112 is that, unlike prior art paired spoke wheels of the types disclosed by the patents to Lovelace, Menet and Dietrich, automated manufacturing equipment can be used to make finished wheels with a spoke hole spacing between holes 80, 82 or 180, 182, at the rim 12, 112 of 26 mm.

On all rims that assignee manufactures to this specification (road and atb diameters), the effective angular dimension between the two spoke holes 180, 182 and a point 190 at the center of the rim is between five degrees (5°) and six degrees (6°), as described above with reference to FIG. 6. It will be understood that the geometry of FIG. 6 and the internal components of FIG. 5 can all be adapted to a front hub, by one of ordinary skill in the art.

In order to limit building a rear wheel with two or less different spoke lengths, the circumferential spoke hole offset between the spoke holes 184 on the left side flange 120 and the spoke holes 186 on the right side flange 122 needs to be between five degrees (5°) and six degrees (6°). In prior commercial embodiments, a spacing for machine built wheels of 1.3 inches (33 mm) was typically used, which would require a seven degree (7°) circumferential offset. However, certain other production wheels did have spacing of as little as 28 mm (1.1 inches). Tolerance for hole placement between the left and right side flanges is ±one degree (1°).

Figure 5:
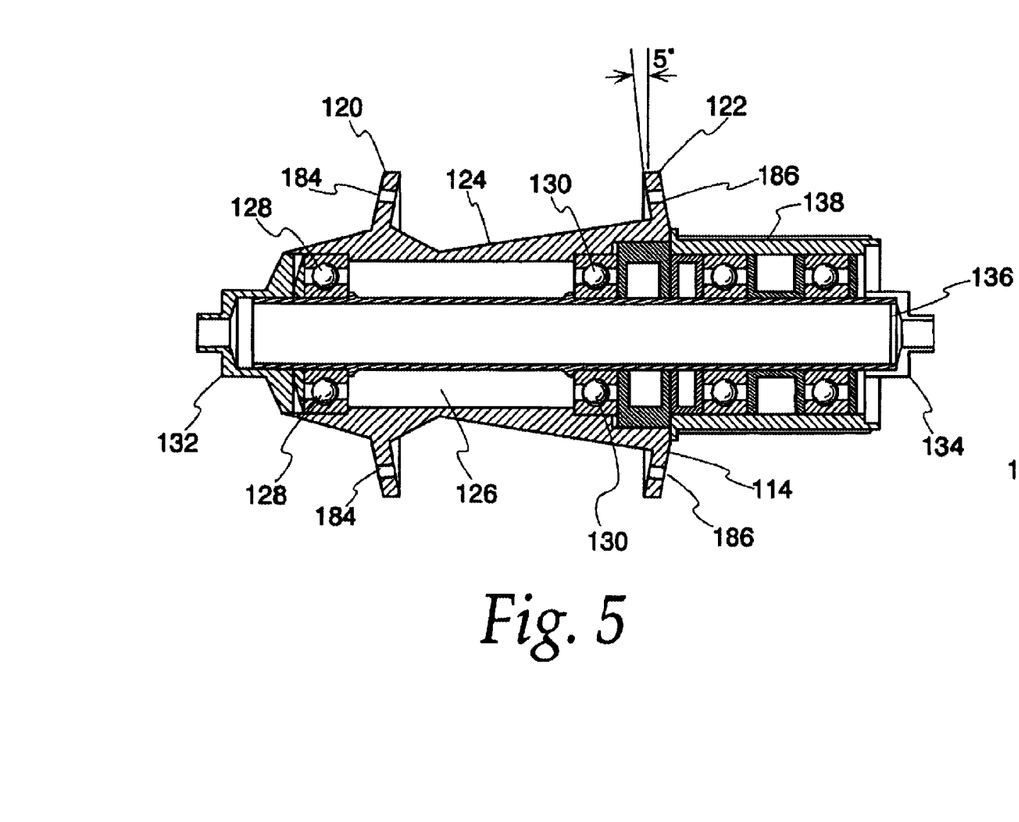
FIG. 5 is a sectional view of a rear hub.

It has also been noted that improved spoke lines may be had by dishing flanges 120, 122 relative to the axle. By angling flanges 120, 122 about five degrees (5°) the flanges are brought more into alignment with the line of the spokes 116, 118 and reduced stress proximate spoke heads 140, 142 can be obtained. Because the hub flanges, 120, 122 are circular (FIG. 6) of course this angling actually forms a shallow conical shape. While FIG. 5 shows this with reference to the rear hub, the same can be advantageously used on a front hub.

Placement of flange 120 spaced inwardly from end 132 a substantial distance as compared to the prior art location shown in broken lines. In practice this spacing is about sixty percent (60%) of the distance flange 122 is spaced inward from end 134. The latter is a function of the size of the drive unit 138 which is increasing due to the adoption of nine and ten speed rear cogsets. This distance compares to only about forty-seven percent (47%) of the depth of a modern drive unit 138 for the prior art non-drive-side flange spacing. This is accomplished by including a much larger exterior bearing housing 190, when compared to the prior art. Indeed, it will be noted in FIG. 6 that proximate end 132, the bearing 128 is actually spaced outside flange 120, while in the prior art, flanges had typically been located at the location of the flanges on both ends of the hub. In this manner both axle-bearing performance, and spoke leading optimization can occur in a dished rear or drive wheel.

The invention enables a manufacturer to reduce the number of different parts needed to manufacture a wheel 10, 110. Rear wheel 110 can be built with just one length spoke 116, 118. An optimized hub 114 has the left and right side flanges 168, 170 displaced from the ideal vertical center of the hub 114—equally spaced from ends 132, 134. This hub 114 coupled with the a rim that uses a laterally offset spoke bed 160 allows us to achieve the assembly of a rear wheel 110 with one spoke length and thus one spoke if required.

In addition to the width of flanges 168, 170 being located such that the angle between the spokes is about eighteen degrees (18°) and the half angle of each—the angle from the vertical—is about nine degrees (9°), loading and stress on the spokes near heads 140, 142, where the spokes are formed with an approximately ninety degree (90°) bend, is further reduced by inclining flanges inwardly at about six degrees (6°). As flanges 140, 142 extend around hub 114, this effectively defines a slightly conical form. The same six degree (6°) conical form can be used advantageously for front flanges 40, 42 to improve the lead of spokes 16, 18.

Rear rim 112 is formed by shortening left wall 162, particularly intermediate portion 172, and extending and right wall 164 considerably, particularly intermediate portion 174, so that tire bead flanges 168, 170 and braking surface portions 176, 178 are substantially centered relative to the spokes 116, 118, hub, 114 and hub flanges 140, 142. In the preferred embodiment, to the extent tube bed or web 166 is slightly offset, its offset is limited to about 0.060 inches, a fairly small dimension, when compared to the prior art, and in fact, being less than the thickness of the typical metal spoke.

The circumferential offset of spokes—most evident in the side, or elevational views—and the lateral offset of the rear rim—most evident in the sectional views, may be used independently or together. When used together they provide a maximized performance bicycle wheel, having the long desired advantages of light weight and strength, but also solving problems that have been noted, but not solved, by bicycle wheel designs for many years.

While the present invention has been disclosed and described with reference to a these embodiments, it will be apparent, as noted above that variations and modifications may be made therein. It is also noted that the present invention is independent of the specific wheel, and is not limited to the specific wheels. It is, thus, intended in the following claims to cover each variation and modification that falls within the true spirit and scope of the present invention.

In accordance with our invention, we claim:

1. A bicycle wheel having a center plane and comprising:

a bicycle wheel hub for supporting the wheel relative to an axle rotatably supported therein, said hub having first and second hub flanges axially displaced from one another, opposite each other, a rim, a given number of pairs of first and second spokes, each of said spokes having a first and a second end connected to one of said hub flanges and to said rim, respectively, so that tension is applied by said first spokes between the first hub flange and a first plurality of points which are circumferentially spaced substantially evenly around the rim and so that tension is applied by said second spokes between the second hub flange and a second plurality of points on said rim each of which is circumferentially offset from between 0.76 inch and less than 1.1 inch from the first plurality of points, so as to define pairs, adjustable threaded means for adjusting the tension in said spokes, independently of any adjustment to the tension in another spoke, the load imposed by said tensioned spokes on said rim being borne primarily by a spoke bed in a hollow rim section, wherein each of said pairs of first and second points on said rim are sufficiently close to each other so that, spoke imposed radial loads on the spoke bed are unconcentrated and are sufficiently close that the opposed spoke imposed sideward loads are substantially balanced.

2. The bicycle wheel of claim 1 further comprising:
    said paired spokes are spaced 1.02 inch apart.

3. The bicycle wheel of claim 1 further comprising:
    said wheel comprising a drive wheel;
    said rim has a spoke bed which receives said spokes;
    left and right walls extending outwardly from said spoke bed said walls being formed and arranged so that said spokes meet substantially proximate to said wheel center plane and said spokes also meet at substantially equal angles off the vertical so as to yield a tension disparity between the left and right side of about two thirds or less.

4. The bicycle wheel of claim 3 further comprising:
    said rim has a tube bed spanning said walls;
    said walls being formed to have first and second intermediate portions and first and second braking surface portions, said first and second intermediate portions extending outwardly from said spoke bed to said first and second braking surface portions, respectively;
    said first intermediate portion extending outwardly from said center plane at an acute angle;
    said second intermediate portion extending outwardly from said center plane at an angle to said center plane that is substantially greater than the angle of said first intermediate portion.

5. The bicycle wheel of claim 4 further comprising:
    said rim has tire bead receiving left and right flanges extending outwardly from said walls at their intersection with said tube bed.

6. The bicycle wheel of claim 4 further comprising:
    the width of said hub flanges being located such that the angle between the spokes is about 18° and the half angle of each—the angle from the vertical—is about 9°.

7. The bicycle wheel of claim 6 further comprising:
    said hub being formed by inclining flanges inwardly at about 6° to define a slightly conical form.

8. The bicycle wheel of claim 1 further comprising:
    said hub being formed by inclining flanges inwardly at about 6° to define a slightly conical form.

9. A drive wheel rim for a spoked bicycle wheel using paired first and second spokes supporting a hub, comprising:
    a first plurality of points which are circumferentially spaced substantially evenly around the rim and adapted to have tension applied by the first spokes against the hub flange and a second plurality of points on said rim each of which is circumferentially offset from between 0.76 inch and less than 1.1 inch from the first plurality of points, adapted to have tension applied by the second spokes;
    said pairs of first and second points on said rim are in a spoke bed and sufficiently close to each other so that, spoke imposed radial loads on the spoke bed are unconcentrated and are sufficiently close that the opposed spoke imposed sideward loads are substantially balanced.

10. The rim of claim 9 further comprising:
    said rim has a spoke bed which receives said spokes;
    said rim having a center plane;
    a spoke bed being formed and arranged to receive said spokes;
    left and right walls extending outwardly from said spoke bed said walls being formed and arranged so that when laced, the spokes meet substantially proximate to said center plane and said spokes also meet at substantially equal angles off the vertical so as to yield a tension disparity between the left and right side of about two thirds or less.

11. The rim of claim 10 further comprising:

said spoke bed being formed in a substantially uniform thickness throughout, so as to substantially uniformly respond to stress imparted when said spokes are laced, tightened to form a wheel and said wheel is operated.

12. The rim of claim 11 further comprising:

said left and right walls being formed in a substantially uniform thickness throughout, so as to substantially uniformly respond to stress imparted when said spokes are laced, tightened to form a wheel and said wheel is operated.

13. The rim of claim 12 further comprising:

said walls merging into left and right braking surfaces being formed in a substantially uniform thickness throughout, so as to substantially uniformly respond to stress imparted when said spokes are laced, tightened to form a wheel and said wheel is operated;

said braking surfaces being substantially vertical, and said braking surfaces being formed in substantially thicker section than said walls.

14. The rim of claim 9 further comprising:

said rim has a spoke bed which receives said spokes;

said rim having a center plane;

a spoke bed being formed and arranged in said rim to receive said first and second spokes;

left and right walls extending outwardly from said spoke bed said walls being formed and arranged so that said spokes meet substantially proximate to said center plane and said spokes also meet at substantially equal angles off the vertical so as to yield a tension disparity between the left and right side of about two thirds or less;

said spoke bed being formed in a substantially uniform thickness throughout, so as to substantially uniformly respond to stress imparted by said spokes;

said left and right walls being formed in a substantially uniform thickness throughout, so as to substantially uniformly respond to stress imparted by said spokes laced, tightened to form said wheel and said wheel is operated;

said walls merging into left and right braking surfaces being formed in a substantially uniform thickness throughout, so as to substantially uniformly respond to stress imparted by said spokes laced, tightened to form a wheel and said wheel is operated;

said braking surfaces being substantially vertical, and said braking surfaces being formed in substantially thicker section than said walls.

15. A bicycle wheel hub for a drive wheel having first and second ends spaced apart by a body, first and second flanges extending substantially circumferentially outward from said body, said body surrounding an axle receiving aperture, a drive member being associated with said first end comprising;

the first and second flanges being formed in a conical shape;

said conical shape being about five degrees (5°) from the vertical;

the first flange being positioned a first distance inboard of said first end;

the second flange being positioned a second distance inboard of said first end;

wherein said second distance is more than fifty percent (50%) of said first distance.

16. The hub of claim 15 further comprising:

said aperture formed to receive bearings to support the axle;

said bearings being received in a first bearing housing and a second bearing housing;

said first bearing housing being proximate said first end;

said second bearing housing being proximate said second end;

said second flange being formed and located inboard of said second bearing housing.

17. The hub of claim 15 further comprising:

said flanges being formed with spoke receiving holes;

said first flange having a plurality of first spoke receiving holes;

said second flange having a plurality of second spoke receiving holes;

each of said first plurality of holes having a selected angular location distributed around the circumference of the flange;

each of said second plurality of holes having a selected angular location distributed around the circumference of the flange offset circumferentially from each of said first plurality of holes by about six degrees (6°).

18. The hub of claim 17 and said each of said second plurality of holes being offset from each of said first plurality of holes by between five degrees (5°) and six degrees (6°).

19. The hub of claim 15 further comprising:

said flanges being formed with spoke receiving holes;

said first flange having a plurality of first spoke receiving holes;

said second flange having a plurality of second spoke receiving holes;

each of said first plurality of holes having a selected angular location distributed around the circumference of the flange;

each of said second plurality of holes having a selected angular location distributed around the circumference of the flange offset circumferentially from each of said first plurality of holes by between five degrees (5°) and six degrees (6°).

20. A paired spoke bicycle drive wheel with a high capacity drive member, a hub, spokes and a rim comprising:

said hub having first and second ends and first and second flanges formed and arranged such that the distance between said second flange and second end is more than half the distance between said first flange and said first end said flanges are conically formed to incline inwardly at about six degrees (6°);

said first and second flanges have first and second series spoke holes arrayed around their respective circumferences such that said first and second series are offset relative to one another by about six degrees (6°);

said spokes are arrayed in pairs of a first spoke and a second spoke;

said spokes are received on said rim in first and second apertures formed in a spoke bed;

said first and second apertures are spaced from one another by about 1 inch.

* * * * *